June 28, 1966      W. L. SHELTON      3,258,095
CENTRIFUGAL CLUTCH WITH LATCH OPERATED WEIGHTS
Filed April 13, 1964      2 Sheets-Sheet 1
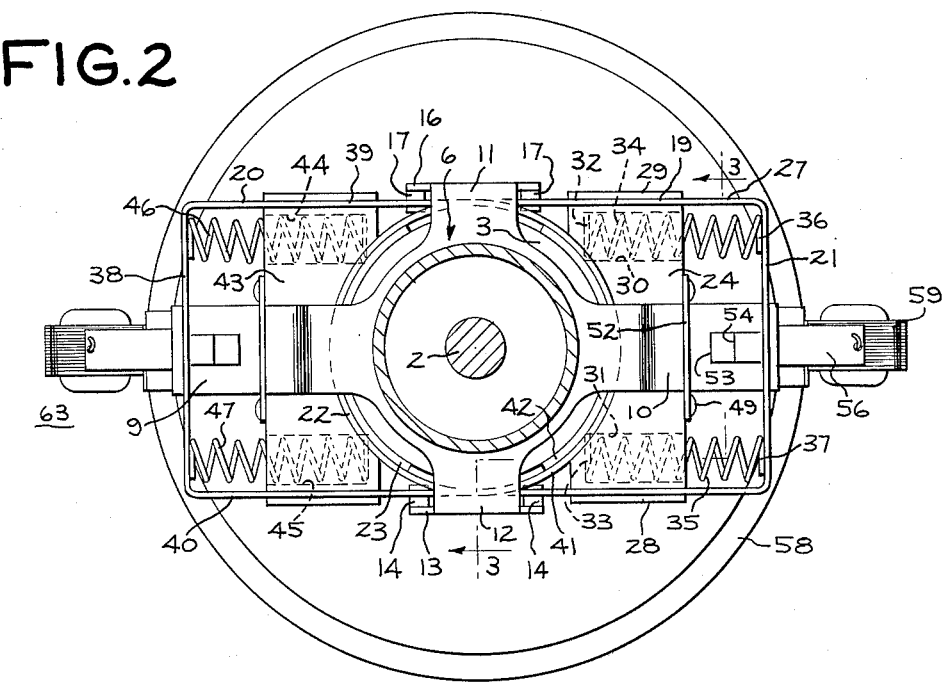
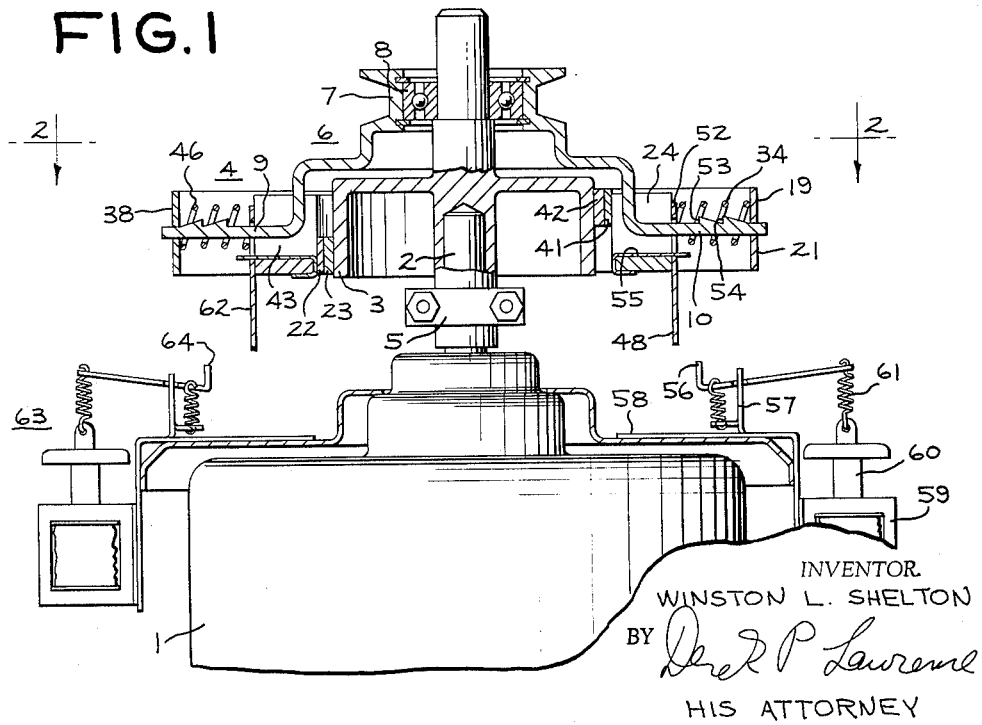
INVENTOR.
WINSTON L. SHELTON
BY
HIS ATTORNEY June 28, 1966 W. L. SHELTON 3,258,095
CENTRIFUGAL CLUTCH WITH LATCH OPERATED WEIGHTS
Filed April 13, 1964 2 Sheets-Sheet 2

INVENTOR.
WINSTON L. SHELTON
BY
HIS ATTORNEY

United States Patent Office 3,258,095
Patented June 28, 1966

3,258,095
CENTRIFUGAL CLUTCH WITH LATCH
OPERATED WEIGHTS
Winston L. Shelton, Jeffersontown, Ky., assignor to General Electric Company, a corporation of New York
Filed Apr. 13, 1964, Ser. No. 359,377
2 Claims. (Cl. 192—103)

This invention relates to clutches, and more particularly to multi-speed clutches of the type which are centrifugally controlled.

It is an object of my invention to provide a new and improved multi-speed clutch wherein use is made of centrifugal force in order to obtain different speeds.

A further more specific object of my invention is to provide such a clutch wherein a centrifugally-moved weight controls the spring force which provides the clutching action so as to determine at what speed slipping of the clutch will start to occur.

In carrying out my invention in one form thereof, I provide a clutch which has an input drum intended to rotate a driven output assembly. This assembly includes clutching means movable mounted in the assembly in driving relation thereto, with a clutching surface engageable with the input drum. The clutching surface is biased into engagement with the drum by spring means which is so arranged that the biasing force increases with deformation of the spring means. The spring means is deformed by a mass mounted on the assembly which moves in response to centrifugal force, the deformation of the spring means increasing as the mass moves in response to increasing centrifugal force. Selective stop means are provided for stopping this centrifugally-caused movement of the mass at different predetermined positions. As a result, different degrees of deformation of the spring means may selectively be achieved, and these in turn cause the clutching surface to slip on the drum—so as to limit the speed of the driven assembly—at different speeds. Thus, dependent on the position of the weight provided by the selective stop means, different output speeds may be achieved for any predetermined load.

The subject matter which I regard as my invention is particularly pointed out and distinctly claimed in the concluding portion of this specification. My invention, however, both as to organization and method of operation together with further objects and advantages thereof, may best be understood by reference to the following description taken in conjunction with the accompanying drawings.

In the drawing:

FIGURE 1 is a side elevational view showing my improved clutch, the mechanism being shown in section to illustrate details;

FIGURE 2 is a view along line 2—2 in FIGURE 1;

Figure 4:
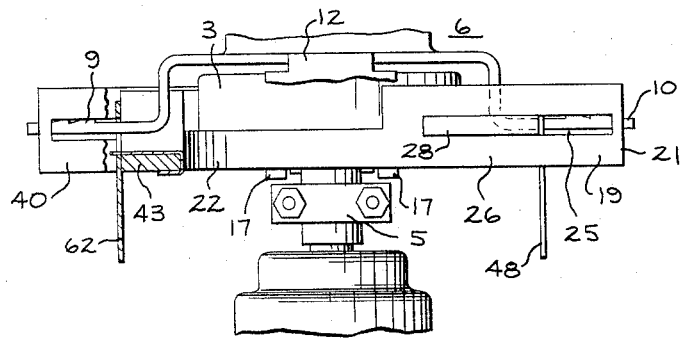
FIGURE 4 is a fragmentary side elevational view illustrating additional details of the invention.

Referring now initially to FIGURES 1 and 2, there is shown part of a suitable drive source, such as a motor 1. Motor 1 has an output shaft 2 to which the driving drum member 3 of a clutch generally indicated at 4 may be secured by any suitable means such as, for instance, a clamping assembly 5. Positioned around drum 3 is an output assembly generally indicated by the numeral 6. Assembly 6 may conventionally include an output pulley 7 as an integral part thereof, and is mounted coaxially with driving drum 3 by means of a ball bearing mount 8. Bearing 8 rotatably secures assembly 6 on shaft 2 so that it may rotate relative to the shaft.

Rigidly connected to pulley 7 are a pair of elongated sections 9 and 10 each extending radially outwardly from shaft 2 on diametrically opposite sides thereof. In addition to sections 9 and 10, assembly 6 also has rigidly connected to output pulley 7 a pair of sections 11 and 12, diametrically opposite each other and spaced 90 degrees from sections 9 and 10. The shape of sections 11 and 12 can best be understood by reference jointly to FIGURES 2 and 3; section 12, for instance, includes a downwardly extending part 13 and inwardly extending tabs 14 at the bottom thereof. If so desired, a depending portion 15 may be provided, extending down from the top. Similarly, section 11 has a downwardly extending part 16, inwardly extending bottom tabs 17, and a depending portion 18.

Figure 3:
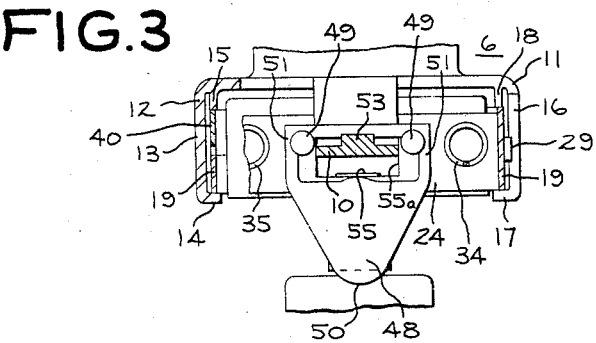
FIGURE 3 is a view along line 3—3 in FIGURE 2.

A pair of clutch frame members 19 and 20 is provided. Frame member 19 is supported on each side by tabs 14 and 17, as shown in FIGURE 3. At its outer end, frame member 19 is supported, as shown in FIGURES 1, 2 and 4, by having the outermost part of portion 10 extend therethrough. Similarly, frame member 20 is supported at its outer end by section 9, and is positioned, where it passes adjacent sections 11 and 12, by downwardly depending portions 18 and 15.

Referring again particularly to frame member 19, it has an outer portion 21 spaced a substantial distance from drum 3, and a curved portion 22 which passes around drum 3 on the opposite side from portion 21. Curved portion 22 includes a clutching surface 23 in engagement with the surface of drum 3. A mass in the form of weight member 24 is supported for sliding motion in frame 19. This is effected by providing frame 19 with a slot on each straight side thereof. This is shown, for instance, in FIGURE 4 wherein an elongated slot 25 is formed in the straight side 26 of frame member 19. A similar slot (not shown) is formed in the other side 27 of the frame member. The weight has a pair of tabs 28 and 29 which extend through these slots so that the weight is supported by the frame member 19, but is slidably movable relative thereto.

Weight 24 has a pair of recesses 30 and 31 formed therein. These recesses receive, respectively, the inner ends 32 and 33 of a pair of compression springs 34 and 35. The outer ends 36 and 37 of the compression springs bear against the outer part 21 of frame member 19.

It will be observed that the frame member 20 is shaped similarly to frame member 19 in that it has an outer portion 38, sides 39 and 40, and an arcuate inner portion 41 which carries a clutching surface 42. A weight 43 is slidably supported in the frame member 20 in the same manner as weight 24 in frame member 19; similarly, weight 43 has recesses 44 and 45 which receive springs 46 and 47 whose outer ends bear against the outer part 38 of frame member 20.

It is to be observed that when the weight 43 is at rest, the springs 46 and 47 cause it to bear against arcuate portion 22 of frame member 19. Thus, springs 46 and 47 bias the frame member 20 to a position which gives a clutching force to the surface 42, and also bias the weight 43 to a position where it improves the clutching force of surface 23. Similarly, springs 34 and 35 bear against the weight 24 so that it engages clutch frame portion 41 to provide a clutching force to surface 42.

Weight 24 is provided with a latch member 48, supported on a pair of guide pins 49 so that the latch may be moved up and down relative to weight 24, but is not otherwise movable relative thereto. The latch member has a lower portion 50 which is intended to be engaged by an actuating member, side portions 51 which cooperate with guide pins 49 to provide the guiding function, and a top portion 52 which effects the intended latching action. This latching is effected in cooperation with stop portions 53 and 54 provided on portion 10. When weight 24 slides radially outwardly, its movement is stopped by the engagement of portion 52 of the latch with stop portion 53 on section 10 unless the latch is raised. If the latch is raised only once, then the weight will get past stop 53, but its outward movement will be stopped by engagement of latch portion 52 with stop 54. If the latch is raised twice, then the weight can keep moving out until its tabs 28 and 29 reach the ends of the slots in frame member 19.

The latch is normally maintained in a position where it may engage the stops by means of a light spring member 55, mounted in the hollowed-out midsection 55a of weight 24 and bearing downwardly on latch 48. In order to provide for upward movement of latch 48 so that weight 24 may selectively be moved, either to the first stop 53 or past it, there is provided an actuating member 56. Member 56 is pivotally supported on a member 57 which, in turn, may be attached to a support 58 secured on the stationary portion of motor 1 (as shown in FIGURE 1).

Also secured on support 58 is a solenoid member 59 having a plunger 60 which is connected, through a spring 61, to the end of member 56. When the solenoid is energized, plunger 60 is pulled down and therefore causes member 56 to pivot on member 57. In so doing, member 56 is moved into the path of latch 48, when the latch is moved outwardly by weight 24. Then, as latch 48 rotates with section 10 in a position adjacent stop 53, it will be engaged by member 56 and pivoted upwardly about one of the guide pins 49, so that weight 24 may move latch 48 past stop 53.

Thus, it can readily be seen that if solenoid 59 is not energized, the outward movement of weight 24 will be stopped at stop 53; similarly, weight 43 will be stopped at its first stop through its latch 62, which is identical to latch 48. If solenoid 59 is energized, weight 24 can move past stop 53 to stop 54, and similarly weight 43 will be able to move out to the second stop.

A second solenoid actuating assembly 63 is provided with a member 64. Member 64 is positioned so that energization of assembly 63 moves it upwardly to a position to cause latch 48 to be raised so it cannot engage stop 54. In other words, if both solenoid assemblies are energized, latch 48 does not engage either stop 53 or stop 54. Consequently, weight 24 moves to its outermost position. The same thing happens to weight 43.

The operation of my improved clutch will now be described. When shaft 2 is not rotating, that is, before motor 1 has started, weights 24 and 43 are in the positions shown. In these positions, they provide a substantial force causing clutching engagement of surfaces 23 and 42 with the surface of drum 3.

When the motor is started, drum 3 starts to rotate and, because of the clutching engagement of surfaces 23 and 42 therewith, the driven assembly 6 is also rotated. As the speed rises the weight 24 and 43 respond to centrifugal force by moving outwardly against the bias of the springs. As weight 24 moves outwardly, it compresses, or deforms, springs 34 and 35 and thereby increases the force which they exert on clutch surface 23 through their engagement with the back 21 of frame member 19. In other words, as the speed rises and weight 24 moves outwardly, the clutching force between drum 3 and surface 23 is increased. The same effect is obtained by the outward movement of weight 43 so as to deform or compress springs 46 and 47.

If neither solenoid assembly is actuated, then the weights 24 and 43 move outwardly only until they engage the first stop members, and then the latches 48 and 62 act to stop any further outward movement of the weights. This means that further compression of the springs is prevented. Thus, since the higher torque required for the speed to be further increased cannot be provided, slipping of the clutching surface 23 on drum 3 will start at a predetermined speed and torque. This predetermined speed and torque depends upon the extent of compressions of the springs which, in turn, is dependent on the position of weights 24 and 43.

If a higher intermediate speed and torque is desired, solenoid 59 only is energized. This energization causes the weights to move out to the second stops (stop 54 in the case of weight 24). This results in a higher degree of compression of the springs and a stronger force causing engagement of clutching surfaces 23 and 42 on drum 3. As a result of this, a higher speed and torque may be obtained before slipping occurs.

Yet a third higher speed and torque may be obtained if solenoid assembly 63 is energized as well as solenoid 59. In such a case, the weights will move to their outermost position to effect maximum compression of the springs and thereby cause the springs to provide the maximum force on the clutching surfaces.

It will be seen from the foregoing that my invention provides an improved multi-speed clutch wherein centrifugal force is used in a novel manner to vary the force of a spring on a clutching surface and thereby vary the torque which may be transmitted through that clutching surface. This, in turn, predetermines a particular speed which, for a given load, will cause slipping of the driven member and therefore no further increase in speed.

While in accordance with the patent statutes I have described what at present is considered to be the preferred embodiment of my invention, it will be obvious to those skilled in the art that various changes and modifications may be made therein without departing from the invention and I therefore aim in the appended claims to cover all such changes and modifications as fall within the true spirit and scope of my invention.

What I claim as new and desire to secure by Letters Patent of the United States is:

1. A multi-speed clutch comprising:
   (a) an input drum;
   (b) a driven output assembly including a frame member mounted on said assembly, a clutching surface supported by said frame member in engagement with said drum, said frame member further having a portion removed from said clutching surface;
   (c) a weight including tab members on each side thereof, said frame member including elongated slots formed therein with said tab members extending through said slots so that said weight is linearly movable the length of said slots in response to centrifugal force;
   (d) spring means engaging said removed portion of said frame member so as to bias said surface into engagement with said drum with a force which increases as said spring means is deformed, said spring means also engaging said weight, said weight increasingly deforming said spring means as it moves in response to centrifugal force;
   (e) and stop means adapted selectively to stop centrifugally caused movement of said weight at different predetermined positions thereby to provide different degrees of deformation of said spring means whereby said clutching surface slips on said drum to vary the torque capability of said clutch dependent on said selective stop means.

2. A multi-speed clutch comprising:
   (a) an input drum;
   (b) a driven output assembly including a frame member mounted on said assembly, a clutching surface supported by said frame member in engagement with said drum, said frame member further having a portion removed from said clutching surface;
   (c) a weight mounted on said frame member on the opposite side of said drum from said clutching surface so as to be movable in response to centrifugal force;
   (d) a coil spring compressed between said weight and said removed portions of said frame member so as to bias said surface into engagement with said drum with a force which increases as said spring means is deformed, said weight increasingly deforming said spring means as it moves in response to centrifugal force;

(e) and stop means adapted selectively to stop centrifugally caused movement of said weight at different predetermined positions thereby to provide different degrees of deformation of said spring means whereby said clutching surface slips on said drum to vary the torque capability of said clutch dependent on said selective stop means.

References Cited by the Examiner

UNITED STATES PATENTS 2,534,133 12/1950 Kirkpatrick _____ 192—105
3,159,257 12/1964 Bochan _____ 192—104

DAVID J. WILLIAMOWSKY, *Primary Examiner.*

DON A. WAITE, *Examiner.*

B. W. WYCHE, III, *Assistant Examiner.*